United States Patent
Pekkucuksen et al.

(10) Patent No.: US 9,432,576 B2
(45) Date of Patent: Aug. 30, 2016

(54) METHOD AND APPARATUS FOR FUSING IMAGES FROM AN ARRAY OF CAMERAS

(71) Applicant: Texas Instruments Incorporated, Dallas, TX (US)

(72) Inventors: Ibrahim Ethem Pekkucuksen, Dallas, TX (US); Aziz Umit Batur, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/449,964

(22) Filed: Aug. 1, 2014

(65) Prior Publication Data

US 2015/0085151 A1    Mar. 26, 2015

Related U.S. Application Data

(60) Provisional application No. 61/861,752, filed on Aug. 2, 2013.

(51) Int. Cl.
*H04N 5/232* (2006.01)
*G06T 3/40* (2006.01)
*H04N 3/14* (2006.01)

(52) U.S. Cl.
CPC ......... *H04N 5/23232* (2013.01); *G06T 3/4053* (2013.01); *H04N 3/1593* (2013.01)

(58) Field of Classification Search
CPC ....................................... H04N 5/349
USPC .................................................... 348/207.99
See application file for complete search history.

(56) References Cited

U.S. PATENT DOCUMENTS

| | | | |
|---|---|---|---|
| 2011/0043667 A1* | 2/2011 | Kotani | 348/241 |
| 2011/0080487 A1* | 4/2011 | Venkataraman et al. | 348/218.1 |
| 2011/0115793 A1* | 5/2011 | Grycewicz | 345/428 |
| 2014/0118507 A1* | 5/2014 | Noh et al. | 348/51 |

* cited by examiner

*Primary Examiner* — Anthony J Daniels
(74) *Attorney, Agent, or Firm* — Gregory J. Albin; Frank D. Cimino

(57) ABSTRACT

An image fusing method, apparatus and system for fusing images from an array of cameras, method includes selecting a camera from the array of cameras as a reference camera, estimating misalignment between the retrieved input images from the reference camera and the retrieved input images from the other cameras, estimating misalignment parameters between the reference camera and the other cameras, estimating local disparity between the reference camera image data and the other cameras based on the estimated misalignment parameters, using the estimated misalignment parameters and the estimated disparity values, mapping the image data into a reference camera grid, the retrieved input image data from the other cameras in the array of cameras is fused in the reference camera grid utilizing fractional offsets from integer coordinates, and producing an output image grid on the reference camera grid and interpolate output pixels using processed data for producing a high resolution image.

20 Claims, 4 Drawing Sheets

METHOD AND APPARATUS FOR FUSING IMAGES FROM AN ARRAY OF CAMERAS

CROSS REFERENCES TO RELATED APPLICATIONS

This application claims priority from U.S. Provisional Patent Application No. 61/861,752 filed on Aug. 2, 2013, which is hereby incorporated by reference in its entirety.

BACKGROUND OF THE INVENTION

1. Field of the Invention

Embodiments of the present invention generally relate to a method and apparatus for combining images taken from an array of parallel cameras while preserving and enhancing details and decreasing noise.

2. Description of the Related Art

It is desirable to use an array of parallel cameras to determine details in an image. In such a setup, cameras are usually side by side looking in the same direction. The images produced by the array of cameras are usually used to produce a high-resolution image. Thus, such a setup, allows for using a regular camera to produce a high-resolution image. In addition, such a setup allows for determining depth information, which may not be available otherwise.

However, such a setup is usually not efficient. Therefore, there is a need for a method and/or apparatus for efficiently combining images taken from an array of parallel cameras while preserving and enhancing details and decreasing noise.

SUMMARY OF THE INVENTION

Embodiments of the present invention relate to an image fusing method, apparatus and system for fusing images from an array of cameras. The method includes retrieving input images from an array of cameras, selecting at least one camera from the array of cameras as a reference camera, estimating misalignment between the retrieved input images from the at least one reference camera and the retrieved input images from the other cameras in the array of cameras, estimating misalignment parameters between the at least one reference camera and the other cameras in the array of cameras, estimating local disparity between the reference camera image data and the other cameras in the array of cameras based on the estimated misalignment parameters, using the estimated misalignment parameters and the estimated disparity values, mapping the image data into a reference camera grid, wherein the retrieved input image data from the other cameras in the array of cameras is fused in the reference camera grid utilizing fractional offsets from integer coordinates, and producing an output image grid on the reference camera grid and interpolate output pixels using processed data for producing a high-resolution image.

BRIEF DESCRIPTION OF THE DRAWINGS

So that the manner in which the above recited features of the present invention may be understood in detail, a more particular description of the invention, briefly summarized above, may be made by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
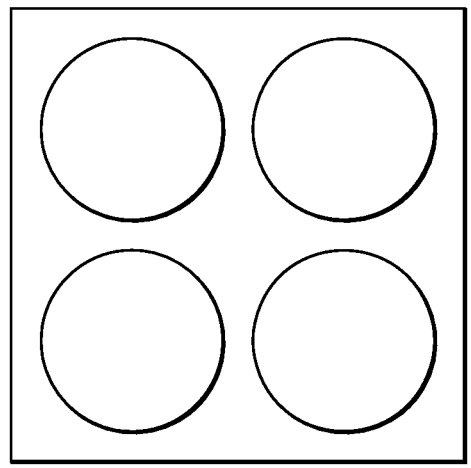
FIG. 1 is an embodiment of a 2×2 camera array.

This invention relates to camera arrays where cameras are aligned in an N×M grid where N and M are the number of cameras in the vertical and horizontal directions, respectively. For example, FIG. 1 is an embodiment of a 2×2 camera array. Such a camera may be connected to a system containing a digital processor for performing the fusing as described in FIG. 2 and FIG. 3 below. In another embodiment, such a system may be internal to at least one camera in the array of cameras. Such a system usually may contain a digital processor, memory, non-transitory readable medium, power module and the like.

Figure 2:
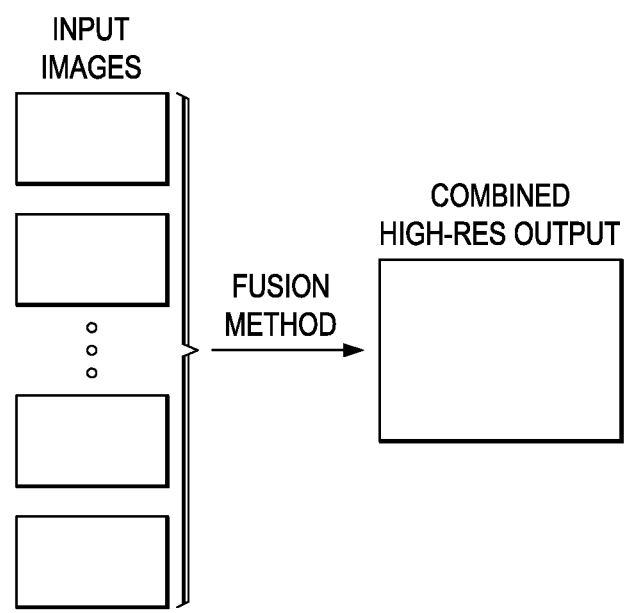
FIG. 2 is an embodiment for fusing images to produce a resolution image.

After capturing images from using an array of cameras, the images are fused to produce a single image. FIG. 2 is an embodiment for fusing images to produce a resolution image. For example, if the individual cameras in the 2×2 example above are 1 megapixel each, the fused image will be larger than 1 megapixel. The exact number of output megapixels may be selected depending on desired output image size. In the 2×2 example above, the typical output size would be 4 megapixels.

In one embodiment, an improved method aligns the images coming from different cameras using a modified perspective transform model, estimates the disparity present between them, and uses the pixel data coming from all images in a local window to interpolate the output pixels.

Figure 3:
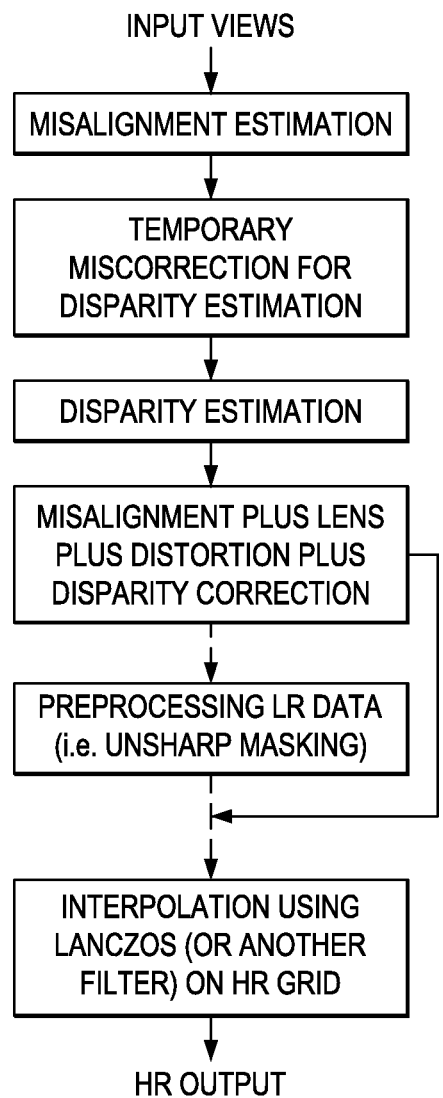
FIG. 3 is an embodiment of a flow diagram depicting an image fusing method for fusing images from an array of cameras.

FIG. 3 is an embodiment of a flow diagram depicting an image fusing method for fusing images from an array of cameras. As shown in FIG. 3, the method selects one of the cameras as the reference camera. The reference camera output defines a center grid and the data coming from other cameras are registered on this grid based on calibration and disparity estimation. Assuming all the cameras in the array are identical, any one of them may be selected as the reference. However, usually, one may select a central or close to the central camera as the reference so as to minimize maximum disparity in the calculations.

Next, the method estimates the global misalignment parameters between each camera and the reference camera, for example using the method described in U.S. patent application Ser. No. 13/298,936, which is herein incorporated by reference. For misalignment estimation, one may use a modified perspective transformation model. For a two-dimensional camera array (e.g. having multiple cameras in both directions), the baseline between the cameras may not always be horizontal or vertical.

Depending on the configuration, there may be a need to handle diagonal baselines. In such a case, the algorithm may generate parameters for arbitrary baselines without the need to rotate the input images. Using homogenous coordinates, a perspective transformation may be written as follows:

$$\begin{bmatrix} X \\ Y \\ Z \end{bmatrix} = \begin{bmatrix} a & b & c \\ d & e & f \\ g & h & 1 \end{bmatrix} \begin{bmatrix} x \\ y \\ 1 \end{bmatrix}$$

Thus, modifying the original transformation model by taking out the directional component that is parallel to the baseline in consideration:

$$\begin{bmatrix} Y \\ Z \end{bmatrix} = \begin{bmatrix} d & e & f \\ g & h & 1 \end{bmatrix} \begin{bmatrix} x \\ y \\ 1 \end{bmatrix}$$

Hence, this enables the user to eliminate the uncertainty caused by the unknown disparity between the views. For instance, for a horizontal baseline, the disparity may show up in the horizontal direction as a function of the scene depth.

For each additional camera, the method estimates local disparity between misalignments, corrected image data and the reference camera image data. In one embodiment, a multi-sized block is used for matching solution for such purposes. However, any disparity estimation algorithm may be used. To estimate the disparity at the sub-pixel level, some type of curve fitting may be employed, for example, a variable second degree polynomial formula for this purpose.

Figure 4:
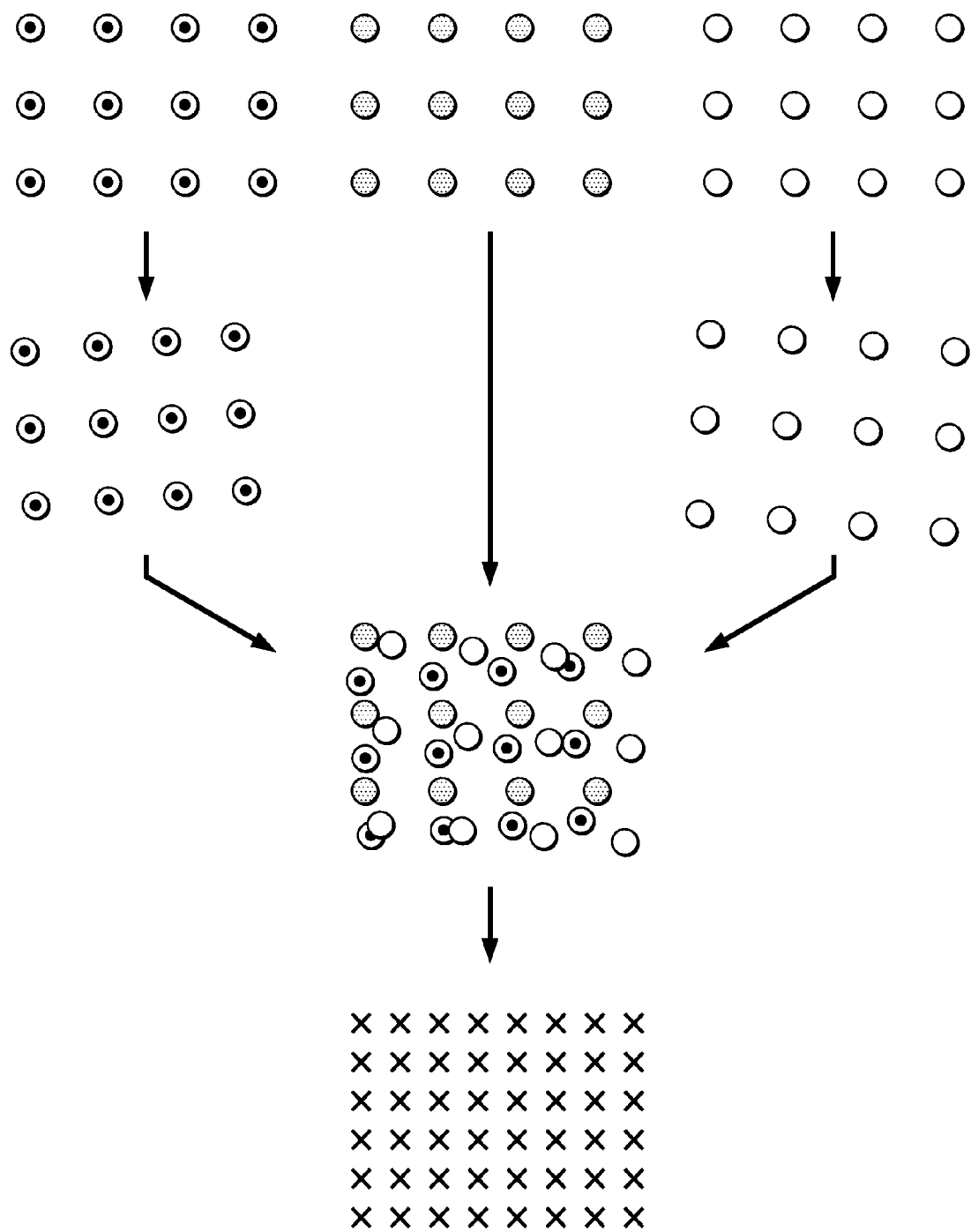
FIG. 4 is an embodiment for mapping image data onto a reference camera grid.

For each additional camera, using global misalignment parameters estimated (e.g. the estimates described in the above), and local disparity values estimated (e.g. the estimates described in the above), the image data may be mapped onto the reference camera grid. FIG. 4 is an embodiment for mapping image data onto a reference camera grid. As a result, the image data from additional cameras is placed on the reference camera grid in terms of fractional offsets from integer coordinates.

In the next step, the method may perform un-sharp masking on combined non-uniform image data coming from all cameras. This optional step is aimed at increasing the fidelity of the low-resolution pixels by using their neighbors coming from other images. Any un-sharp masking approach that could work on non-uniform samples may be used here.

Figure 5:
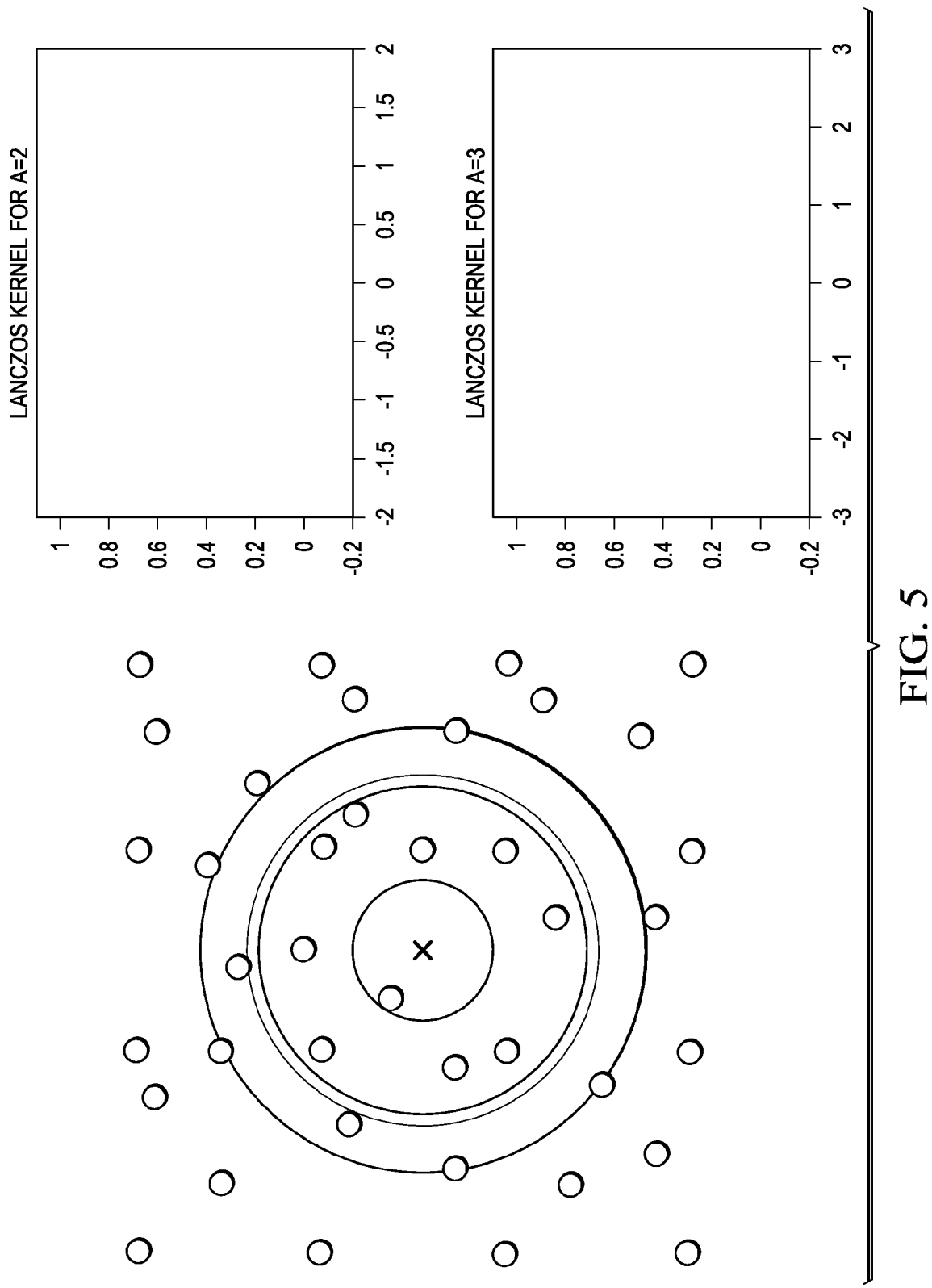
FIG. 5 is an embodiment of a Lanczos filter and its application to a reference camera grid.

Finally, depending on the desired output size, the method may define an output image grid on the reference camera grid, and interpolate output pixels using processed data described in step 5. For example, Lanczos filter may be used for this interpolation, but other filters may be used as well. FIG. 5 is an embodiment of a Lanczos filter and its application to a reference camera grid. The output of the Lanczos filter provides the high-resolution output image.

Other methods assume a rotational and translational relationship between the input images. For a camera array that is not perfectly calibrated, this assumption does not hold. Thus, in one embodiment, the method and apparatus described herein accounts for the small perspective differences between the cameras with a modified perspective transformation model. Furthermore, the method and apparatus described above may not be iterative in nature and may not perform any additional processing for de-noising; thus, noise reduction and resolution enhancement are achieved with a single interpolation process. Hence, creating a single high-resolution low-noise image from several low-resolution high-noise samples obtained from an array of cameras is enabled herein without requiring perfect camera calibration to achieve this.

While the foregoing is directed to embodiments of the present invention, other and further embodiments of the invention may be devised without departing from the basic scope thereof, and the scope thereof is determined by the claims that follow.

What is claimed is:

1. An image fusing method for fusing images from an array of cameras, comprising:
   retrieving, with a digital processor, input images from the array of cameras;
   selecting, with the digital processor, a camera from the array of cameras as a reference camera;
   estimating, with the digital processor, misalignment between retrieved input images from the reference camera and retrieved input images from other cameras in the array of cameras;
   estimating, with the digital processor, misalignment parameters between the reference camera and the other cameras in the array of cameras;
   correcting, with the digitial processor, the retrieved input images from the other cameras based on the estimated misalignment parameters to generate corrected image data;
   estimating, with the digital processor, local disparity between image data from the reference camera and the corrected image data from the other cameras in the array of cameras;
   using, with the digital processor, the estimated misalignment parameters and the estimated local disparity to map image data from the other cameras onto a reference camera grid corresponding to the reference camera, wherein the retrieved input image data from the other cameras in the array of cameras is fused in the reference camera grid utilizing fractional offsets from integer coordinates;
   producing, with the digitial processor, an output image grid on the reference camera grid; and
   interpolating, with the digitial processor, output pixels using processed data for producing a high-resolution image.

2. The method of claim 1 further comprising estimating the local disparity at a sub-pixel level using curve fitting.

3. The method of claim 2, wherein the curve fitting is a variable second degree polynomial.

4. The method of claim 1 further comprising performing un-sharp masking on combined non-uniform image data coming from all cameras for increasing fidelity of low-resolution pixels by using neighbors of the low-resolution pixels.

5. The method of claim 1 further comprising handling a diagonal baseline.

6. The method of claim 5, wherein handling the diagonal baseline includes modifying a transformation model by taking out a directional component that is parallel to the diagonal baseline.

7. The method of claim 1, wherein interpolating the output pixels includes using a filter, and wherein the filter is at least one of a Lanczos filter, a Bilinear filter and a Bicubic filter.

8. A non-transitory computer readable medium comprising instructions that, when executed, cause a processor to:
   retrieve input images from an array of cameras;
   select a camera from the array of cameras as a reference camera;
   estimate misalignment between retrieved input images from the reference camera and retrieved input images from other cameras in the array of cameras;

estimate misalignment parameters between the reference camera and the other cameras in the array of cameras;

correct the retrieved input images from the other cameras based on the estimated misalignment parameters to generate corrected image data;

estimate local disparity between image data from the reference camera and the corrected image data from the other cameras in the array of cameras;

using the estimated misalignment parameters and the estimated local disparity to map image data from the other cameras onto a reference camera grid, wherein the retrieved input image data from the other cameras in the array of cameras is fused in the reference camera grid utilizing fractional offsets from integer coordinates;

produce an output image grid on the reference camera grid; and interpolate output pixels using processed data for producing a high-resolution image.

9. The non-transitory readable medium of claim 8 further comprising estimating the local disparity at a sub-pixel level using curve fitting.

10. The non-transitory readable medium of claim 9, wherein the curve fitting is a variable second degree polynomial.

11. The non-transitory readable medium of claim 8 further comprising performing un-sharp masking on combined non-uniform image data coming from all cameras for increasing fidelity of low-resolution pixels by using neighbors of the low-resolution pixels.

12. The non-transitory readable medium of claim 8 further comprising handling a diagonal baseline.

13. The non-transitory readable medium of claim 12, wherein handling the diagonal baseline includes modifying a transformation model by taking out a directional component that is parallel to the diagonal baseline.

14. The non-transitory readable medium of claim 9, wherein the instructions that cause the processor to interpolate include instructions that cause the processor to use a filter, and wherein the filter is at least one of a Lanczos filter, a Bilinear filter and a Bicubic filter.

15. An image fusing system, comprising:
a memory; and
a digital processor configured to:
retrieve input images from an array of cameras;
select a camera from the array of cameras as a reference camera;
estimate misalignment between retrieved input images from the reference camera and retrieved input images from other cameras in the array of cameras;
estimate misalignment parameters between the reference camera and the other cameras in the array of cameras;
correct the retrieved input images from the other cameras based on the estimated misalignment parameters to generate corrected image data;
estimate local disparity between image data from the reference camera and the corrected image data the other cameras in the array of cameras;
using the estimated misalignment parameters and the estimated local disparity to map image data from the other cameras onto a reference camera grid, wherein the retrieved input image data from the other cameras in the array of cameras is fused in the reference camera grid utilizing fractional offsets from integer coordinates;
produce an output image grid on the reference camera grid; and
interpolate output pixels using processed data for producing a high-resolution image.

16. The image fusing system of claim 15 further comprising estimating the local disparity at a sub-pixel level using curve fitting.

17. The image fusing system of claim 16, wherein the curve fitting is a variable second degree polynomial.

18. The image fusing system of claim 15 further comprising performing un-sharp masking on combined non-uniform image data coming from all cameras for increasing fidelity of low-resolution pixels by using neighbors of the low-resolution pixels coming from the images.

19. The image fusing system of claim 15 wherein the digital processor is further configured to handle a diagonal baseline, wherein handling the diagonal baseline includes modifying a transformation model by taking out a directional component that is parallel to the diagonal baseline.

20. The image fusing system of claim 15, wherein the digital processor is further configured to interpolate the output pixels using a filter, and wherein the filter is at least one of a Lanczos filter, a Bilinear filter and a Bicubic filter.

* * * * *